UNITED STATES PATENT OFFICE.

JACOB BLUMER, OF BROOKLYN, AND CHARLES SCHLAGENHAUFER, OF NEW YORK, N. Y., ASSIGNORS TO RICHARD N. DYER, TRUSTEE, OF EAST ORANGE, NEW JERSEY.

METHOD OF MAKING YEAST.

SPECIFICATION forming part of Letters Patent No. 563,124, dated June 30, 1896.

Application filed June 8, 1892. Serial No. 435,959. (No specimens.)

*To all whom it may concern:*

Be it known that we, JACOB BLUMER, a citizen of the United States, residing at Brooklyn, in the county of Kings, and CHARLES SCHLAGENHAUFER, a subject of the Emperor of Austria-Hungary, residing at New York city, in the county of New York, State of New York, have invented certain new and useful Improvements in Methods of Making Yeast, of which the following is a specification.

The present invention relates to the manufacture of yeast, especially compressed yeast, from cereals or other starch-bearing materials, the object of the invention being to enable the use of whole or only partly-broken grains of corn or other starch-bearing materials.

We have found that it is not always necessary to reduce the starch-bearing raw material to small fragments for the process of extracting the soluble parts, but that we are also able to extract them from whole or only slightly-broken starch-bearing materials in a sufficiently concentrated form, in a reasonable time, and in an easier and more economical manner by employing higher temperatures for the extraction than those recommended for use with ground materials by our Patents Nos. 474,942 and 474,943, which temperatures, however, should never be high enough to change the starch substantially, and that we may use such extract in carrying out our method with especial advantage if certain precautions, hereinafter mentioned, are taken.

In using starch-bearing materials, especially cereals in whole grains, we can raise the temperature in extracting the raw material without danger to about 60° centigrade. The starch in the material, being protected by the undestroyed surrounding cellular tissues, is left perfectly intact. In using the raw material in slightly-broken form, it is necessary to be more careful in raising the temperature, but it will be easy to conduct the process of extraction in such manner as to leave the starch intact, so that it will be possible to use the remaining material for the purpose of making starch or its derivatives or for any other suitable purpose.

If we employ higher temperatures than 50° centigrade, a greater amount of organic acids, such as lactic, butyric, or other higher fatty acids, will be formed during extraction, and it will be advantageous to reduce this acidity, which often becomes too high to get the best results from the extract, by a treatment with alkali before fermenting the extract, in order to obtain an entirely fit solution for the cultivation and growth of yeast. Sometimes the step of neutralization is advantageous also with extracts obtained at low temperatures.

The following is a full description of the preferred method of manufacturing yeast according to this invention.

The starch-bearing material, whole or slightly broken, is steeped with a suitable liquid, such as water or water with diluted solutions of acids or alkalies, for a suitable time. The time necessary to form the extract will depend on the temperature employed during extraction. The main point to be observed in reference to the temperature is that it should never be high enough to gelatinize the starch or to change it substantially. The maximum limit will be about 60° centigrade, but will vary to some extent with the nature of the material employed. After the lapse of a certain time, a sufficient part of the soluble matter will be extracted and the liquid extract is then separated from the remaining solid material, which contains all of the starch of the starch-bearing material, and which can be used for any desired purpose. This separation may be effected by drawing off, decanting, filtering, or other suitable process. The clear extract obtained is a solution of sugar, dextrine, mineral salts, and various albuminous substances, the proportions of each depending on the kind of material used. This extract is placed in a heater or digester and heated to from 60° to 130° centigrade in order to sterilize the liquid, *i. e.*, to destroy the bacteria contained in the extract. In doing so, a certain amount of albuminous matter will coagulate. Before, during, or after sterilization we find it advantageous to reduce the acidity of the extract by treating with alkali, preferably lime. It will generally be sufficient to reduce the acid to such an extent that the liquid contains not more acid than three cubic centimeters of normal alkali could naturalize in one hundred cubic centimeters of the extract. In sterilizing the extract and treating it with an alkali, precipitates of certain organic matters are formed, which may be separated by any suitable process. The clear wort thus obtained is cooled down to about 25° to 35° centigrade, is mixed with a small amount of mother-yeast, and is then fermented. The fermentation should be conducted carefully at a temperature of about 25° to 35° centigrade, the liquid preferably being continuously agitated. After the fermentation is finished, the liquid is cooled down to about 15° centigrade, when the yeast formed will settle, and as soon as the liquid appears clear it is drawn off carefully. The yeast is then washed with cold water, and is pumped into a filter-press in order to obtain the yeast in compressed form, if desired.

The procedure described enables us to obtain the desired extract in a more rapid and economical manner than by the methods described in our prior patents. By treating the wort with alkali before fermentation we eliminate a surplus of acids and at the same time certain organic matters which would prevent a perfect fermentation and regular growth of the yeast-plant. The treatment with alkali also causes the yeast to settle quicker and better, the collection of the yeast becomes easier and more perfect, and therefore the resulting yield is higher.

What we claim is—

1. The method of making yeast which consists in extracting soluble substances from whole or only slightly-broken grains of cereals or other starch-bearing materials in a suitable liquid, and at a temperature which leaves the starch substantially intact, separating the extract from the solid material, sowing yeast in the extract fermenting said extract, thereby forming new yeast, and separating the yeast, substantially as described.

2. The method of making yeast which consists in extracting soluble substances from whole or only slightly-broken grains of cereals or other starch-bearing materials in a suitable liquid, and at a temperature which leaves the starch substantially intact, separating the extract from the solid material, sterilizing the extract, separating the coagulum therefrom, sowing yeast in the clear liquid, fermenting said liquid, thereby forming new yeast, and separating the yeast, substantially as described.

3. The method of making yeast which consists in extracting soluble substances from cereals or other starch-bearing materials in a suitable liquid, and at a temperature which leaves the starch substantially intact, separating the extract from the solid material, sterilizing the extract, treating it with an alkali, separating the precipitates from the extract, sowing yeast in the clear liquid fermenting said liquid, thereby forming new yeast, and separating the yeast, substantially as described.

4. The method of making yeast which consists in extracting soluble substances from cereals or other starch-bearing materials in a suitable liquid, and at a temperature which leaves the starch substantially intact, separating the extract from the solid material, treating it with an alkali, separating the precipitate from the extract, sowing yeast in the clear liquid fermenting said liquid, thereby forming new yeast, and separating the yeast, substantially as described.

5. The method of making yeast which consists in extracting soluble substances from unmalted starch-bearing materials at a temperature higher than 50° centigrade, but leaving the starch substantially intact, separating such extract from the solid material, treating it with an alkali, separating the precipitate, sowing yeast in the extract, fermenting said liquid, thereby forming new yeast, and separating the yeast, substantially as described.

6. The method of making yeast which consists in extracting soluble substances from unmalted starch-bearing materials at a temperature higher than 50° centigrade, but leaving the starch substantially intact, separating such extract from the solid material, sterilizing the extract and treating it with an alkali, separating the precipitates, sowing yeast in the extract, fermenting the said liquid, thereby forming new yeast, and separating the yeast, substantially as described.

This specification signed and witnessed this 7th day of June, 1892.

JACOB BLUMER.
CHAS. SCHLAGENHAUFER.

Witnesses:
CHARLES M. CATLIN,
GEORGE B. BUCHANAN.